(12) United States Patent
Guillot et al.

(10) Patent No.: US 7,866,109 B2
(45) Date of Patent: Jan. 11, 2011

(54) STRUCTURAL DEVICE FOR IMPROVING THE THERMAL EXPANSION RESISTANCE OF A STRUCTURE

(75) Inventors: Nicolas Guillot, Cannes la Bocca (FR);
Gilles Pommatau, Mandelieu (FR);
Olivier Damiano, Les Adrets de l'esterel (FR)

(73) Assignee: Thales (FR)

( * ) Notice: Subject to any disclaimer, the term of this patent is extended or adjusted under 35 U.S.C. 154(b) by 105 days.

(21) Appl. No.: 12/255,803

(22) Filed: Oct. 22, 2008

(65) Prior Publication Data

US 2009/0100777 A1    Apr. 23, 2009

(30) Foreign Application Priority Data

Oct. 23, 2007    (FR) .................................. 07 07420

(51) Int. Cl.
*E04C 2/38* (2006.01)
(52) U.S. Cl. .................. 52/582.1; 52/285.1; 52/800.12; 244/131
(58) Field of Classification Search ................ 52/285.1, 52/285.3, 716.8, 800.12, 800.14, 800.16, 52/800.18, 581, 582.1, 584.12; 403/236, 403/196; 156/71, 91, 292, 295; 244/131
See application file for complete search history.

(56) References Cited

U.S. PATENT DOCUMENTS

| | | | | |
|---|---|---|---|---|
| 2,235,078 A | * | 3/1941 | Meisterhans | 411/82.2 |
| 3,192,671 A | | 7/1965 | Smith | |
| 3,349,533 A | * | 10/1967 | Gregoire | 52/716.8 |
| 3,416,282 A | * | 12/1968 | Daugherty | 52/716.8 |
| 3,716,011 A | * | 2/1973 | Butler | 114/132 |
| 3,738,083 A | * | 6/1973 | Shimano | 52/584.1 |
| 3,981,118 A | * | 9/1976 | Johnson et al. | 52/716.8 |
| 4,129,970 A | * | 12/1978 | Whitney | 52/282.3 |
| 4,603,531 A | * | 8/1986 | Nash | 52/793.1 |
| 4,914,888 A | * | 4/1990 | Hanson | 52/768 |
| 4,951,783 A | * | 8/1990 | Kamprath et al. | 184/1.5 |
| 4,998,841 A | * | 3/1991 | Wilde | 403/104 |
| 5,324,146 A | * | 6/1994 | Parenti et al. | 411/82 |
| 5,520,477 A | * | 5/1996 | Fink | 403/397 |
| 5,542,777 A | * | 8/1996 | Johnson | 403/389 |
| 6,311,442 B1 | * | 11/2001 | Watanabe | 52/282.3 |
| 6,655,106 B1 | * | 12/2003 | Sucre | 52/846 |
| 6,928,786 B2 | * | 8/2005 | Orozco | 52/800.12 |
| 6,991,399 B2 | * | 1/2006 | Park et al. | 403/355 |

\* cited by examiner

*Primary Examiner*—Robert J Canfield
*Assistant Examiner*—Babajide Demuren
(74) *Attorney, Agent, or Firm*—Lowe Hauptman Ham & Berner, LLP

(57) ABSTRACT

The structural panel assembly structure has a rigid, substantially plane panel and at least one one-piece attachment part, produced by moulding, glued to the panel. The attachment part has a first plane face including a recess that can receive a glue and rims intended to retain the glue around the recess and at least one opening. A bar is fastened to the first plane face. The materials of the attachment part and the panel are composite materials and the bar has a metal insert that is inserted when moulding the attachment part and is intended to be threaded.

8 Claims, 5 Drawing Sheets

STRUCTURAL DEVICE FOR IMPROVING THE THERMAL EXPANSION RESISTANCE OF A STRUCTURE

RELATED APPLICATIONS

The present application is based on, and claims priority from, French Application Number 0707420, filed Oct. 23, 2007, the disclosure of which is hereby incorporated by reference herein in its entirety.

TECHNICAL FIELD

The present invention concerns the field of devices for assembling panels with surfaces of composite materials based on carbon fibres using attachment parts also known as structural attachment fittings. The device of the invention relates more particularly to the field of assembling satellite structures for space applications in which the limit temperatures [−50° C., +80° C.] impose thermal expansion of the structures.

BACKGROUND OF THE INVENTION

At present, the structures of satellites intended to be stationed in space are composed of sandwich panels, the skins of which are generally of carbon. To assemble these panels, attachment parts are used to join and fix the panels to each other. The panels are generally assembled to produce a box-like or compartmented structure adapted to receive a payload.

For example, one known solution uses an aluminium attachment part comprising two plane parallel faces between which a composite panel based on carbon fibre is inserted and then glued. The attachment part can then be attached, for example screwed, to another attachment part.

Given the missions of the satellites, the conditions in space impose large temperature variations on their structures. It is generally considered that the range [−50° C., +80° C.] applies to most geostationary telecommunication satellite missions.

In the event of such temperature variations, the materials of the structures expand and create resisting forces at the joints of the assembled structures and more particularly at the glued joints between a panel and an attachment part. The materials being different, the coefficients of expansion are also different, of the order of $2.10^{-6}$ $K^{-1}$ for carbon and of the order of $20.10^{-6}$ $K^{-1}$ for aluminium, which causes high shear forces in the glue at high and low temperatures.

Under these conditions, it is considered that at −50° C. the reduction in the strength of the structures at the level of the attachment parts can be close to 40% of that at ambient temperature, given the difference between the coefficients of thermal expansion of aluminium and carbon.

Furthermore, modern satellites are increasingly multipurpose satellites with varied and diverse missions, leading to consideration of a wider range of temperatures of the satellite structure. The range of temperatures to be taken into account being ever wider, the potential dangers of the structures breaking are increased.

With regard to this type of application, in practice, to fasten an attachment part to a panel, at least one previously machined plane surface of the attachment part is generally glued to the panel. The panels are fastened together when the attachment parts join them two by two.

One drawback of such devices is that at low and high temperatures materials having different coefficients of expansion, when glued together, are subject to high forces essentially supported by the glued joints.

One risk incurred is the glued joint breaking prematurely, as a consequence of expansion of the materials caused by numerous variations of temperature over a wide range.

Under these conditions, strengthening the attachment parts to reduce the danger of the joint breaking leads to numerous implementation problems.

One known solution that partly solves these problems uses titanium structural attachment fittings, titanium having a coefficient of expansion closer to that of carbon than aluminium.

On the other hand, this solution has the drawbacks of being costly, of making the part difficult to machine, and of necessitating surface treatment, which is a major constraint.

Another known solution replaces the metal structural attachment fittings with laminated carbon blocks hot-glued to the panel at the time of polymerizing the skins.

This solution has new drawbacks. In particular, high creep of the carbon in the direction perpendicular to that of the fibres, especially at high temperatures, and the difficulty of making a screwed connection between two panels complicate the production of the attachment devices and the panels. Moreover, this solution makes it obligatory to determine detailed panel assembly specifications at a very early stage in the fabrication process.

SUMMARY OF THE INVENTION

An object of the invention is to eliminate these drawbacks. The device of the invention provides an attachment part moulded in the same material as the panel or a similar material, in particular in carbon fibre, the coefficient of expansion whereof is low, and provides in the moulded part a metal insert able to withstand the passage of mechanical loads between the panels of the structure. This solution has the advantage of providing a method of producing screwed assemblies and of transferring the load supported by the glued joints to the metal insert included in a fitting consisting of carbon fibres or bundles of carbon fibres.

The structural panel assembly structure advantageously includes:

a rigid, substantially plane panel;
at least one one-piece attachment part, produced by moulding, glued to the panel, the attachment part comprising:
at least one first plane face, called a "blade", comprising:
a recess that can receive a glue; and
rims intended to retain the glue around the recess and at least one opening;
a bar fastened to the first plane face.

The structural panel assembly structure is advantageously characterized in that:

the materials of the attachment part and the panel are composite materials; and
the bar comprises a metal insert the coefficient of expansion whereof is greater than that of the material of the attachment part, the metal insert being positioned in the mould when moulding the attachment part.

The attachment part is advantageously made up of bundles of carbon fibres pre-impregnated with a heat-set resin.

The metal insert advantageously comprises a flange inside the bar preventing extraction of the insert.

The metal insert advantageously comprises two substantially cylindrical parts, the part of greater diameter being the flange.

The metal insert is advantageously in aluminium.

The axis of the metal insert is advantageously in the plane of the blade of the attachment part.

The structure advantageously comprises a second blade parallel to the first blade and having the same characteristics, both blades being fastened to the bar, the distance between the two blades substantially corresponding to the thickness of the panel, the attachment part forming a saddle.

The blades advantageously each comprise at least three openings, one of which can be used to insert glue into the recess of the blades and the other two being locating holes.

The method of producing a structural panel assembly structure advantageously includes:
- a first step of hot compression of carbon fibres impregnated with a heat-set resin in a mould comprising a metal insert, the part moulded in this way being referred to as an attachment part and comprising:
- a first part formed of at least one first plane face, called the blade, comprising a recess and at least one hole through the blade;
- a second part formed of a bar fastened to the first plane face comprising the metal insert the coefficient of expansion whereof is greater than that of the composite material;
- a second step of threading the metal insert in such a manner as to thread the bar of the attachment part;
- a third step of gluing the first plane face of the attachment part to a structural panel the skins of which are in carbon.

The first step is advantageously carried out at a temperature close to 120° C.

The first step advantageously comprises the production by moulding of two other holes through the blade for locating the attachment part on the panel, the latter comprising marking points, the holes being referred to as "locating holes".

The direction of threading of the metal insert is advantageously in the plane of the blades and on an axis parallel to the direction of inserting the panel into the attachment part.

A step of producing marking points on the skin of the panel advantageously comprises machining holes in the skins.

The third step is advantageously carried out by introducing a glue into the recess of at least one blade through a hole through the blade.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1A:
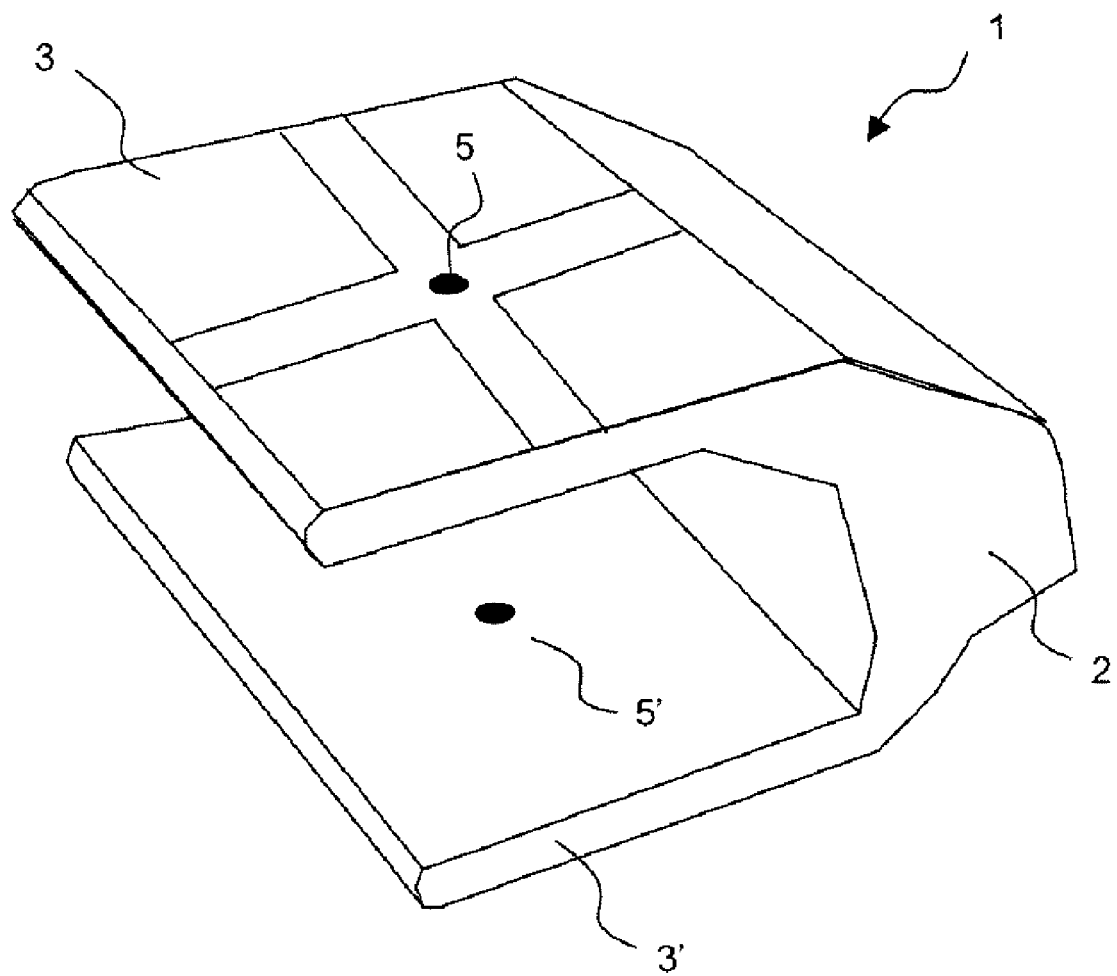
FIG. 1A is a 3D view of one embodiment of an attachment part of the invention.

FIG. 1A represents one embodiment of the essential means of the invention represented by the attachment part 1. This is moulded by hot compression in a composite material such as bundles of carbon fibres pre-impregnated with a heat-set resin. The resin can be epoxy resin, for example. To this end a mould is produced for the attachment part.

In the remainder of the description a distinction is made between two different functional parts of the one-piece attachment part 1. The first constitutes the bar 2 that is used to fix the attachment part 1 to another attachment part, for example by means of a screw, and in FIG. 1 the second consists of two parallel faces 3, 3', for which the technical term is "blades". In particular they receive a plane panel the thickness whereof is substantially equal to the distance between these two faces.

The attachment part is moulded at a temperature close to 120° C. to soften the carbon-based material so that it is able to assume the shape of the mould.

Curing takes approximately 5 minutes. The mould includes two projecting portions for producing holes 5, 5' in the blades 3, 3' of the attachment part 1. The holes 5, 5' are used to infiltrate glue onto the internal surfaces of the attachment part 1.

Figure 1B:
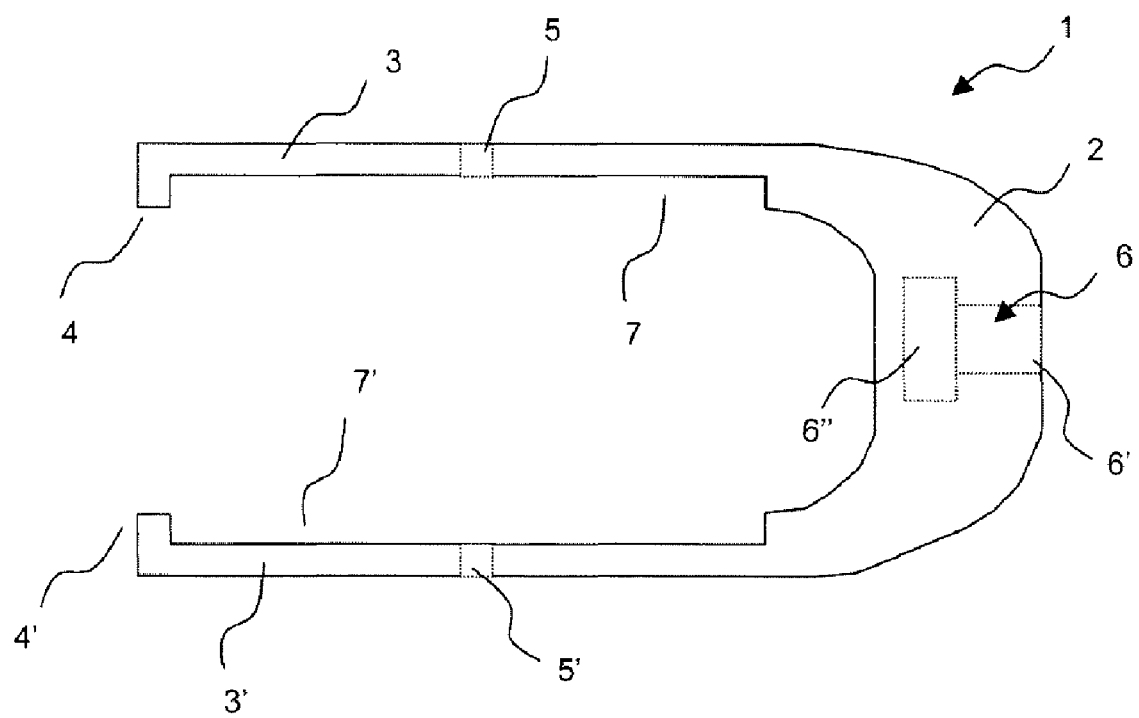
FIG. 1B is a view in section of one embodiment of an attachment part of the invention.

FIG. 1B is a view in section of the attachment part 1. The invention moulds the attachment part 1 and inserts a metal insert 6 into it during moulding. The metal insert 6 can advantageously be in aluminium and comprise a cylindrical first part 6' and a second part 6" forming a flange, the two parts being joined together. The flange 6" retains the insert inside the attachment part 1 when transmitting axial forces.

In its end use, the insert is intended to be tapped in order to enable an axial attachment to be fixed by means of a screw, for example.

In a preferred embodiment, the flange 6" can also be of cylindrical shape and concentric with the cylindrical first part 6'.

The metal insert is advantageously positioned so that the axis of the cylindrical first part 6' of the insert 6 is in the plane of the blades 3, 3', the axis of the insert being parallel to the direction of application of the attachment part to a panel. To optimize the distribution of loads, the metal insert can be centred on the external face of the bar.

During moulding of the attachment part by hot compression at a temperature close to 120° C., the expanded metal insert advantageously produces on cooling a small clearance between the metal insert and the attachment part. This clearance, on subsequent expansion in an environment at temperatures in the range [−50° C., +80° C.], prevents additional forces on the attachment part caused by thermal expansion of the metal insert.

On the inside of the part 1, the blades 3, 3' each comprise a recess 7, 7'. This recess 7, 7' receives the glue when it is introduced via the orifices 5, 5' with the panel inserted between the blades 3, 3'. There are two rims shown. Each has a surface 4 that provides a seal between the panel and the attachment, such that the recess 7 and the panel retain the glue as it sets. Each rim also has an outer surface 4'.

Figure 2:
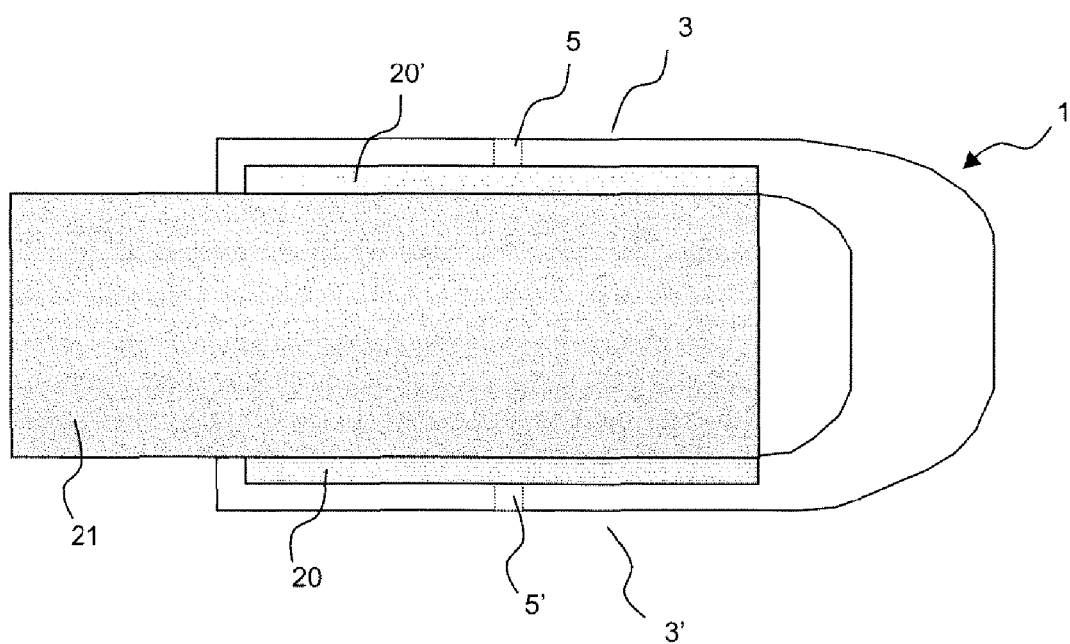
FIG. 2 is a view in section of the combination of an attachment part, a panel and a glued joint.

FIG. 2 represents a structural device of the invention comprising the attachment part 1, a panel 21 comprising an upper skin and a lower skin, and a glue 20, 20' inserted via the orifices 5, 5'. The panel 21 is inserted between the two blades 3, 3' of the attachment part 1. The glue is injected via the orifices 5, 5' and accumulates in the recesses 7, 7'.

The panel 21 is then held in the part 1 by adhesion of the faces of the attachment part 1 and the skins of the panel.

One example of a satellite structural panel of the invention comprises two exterior carbon skins intended to be glued to the inside faces of the attachment part 1 and a honeycomb structure inside the panel.

Figure 3:
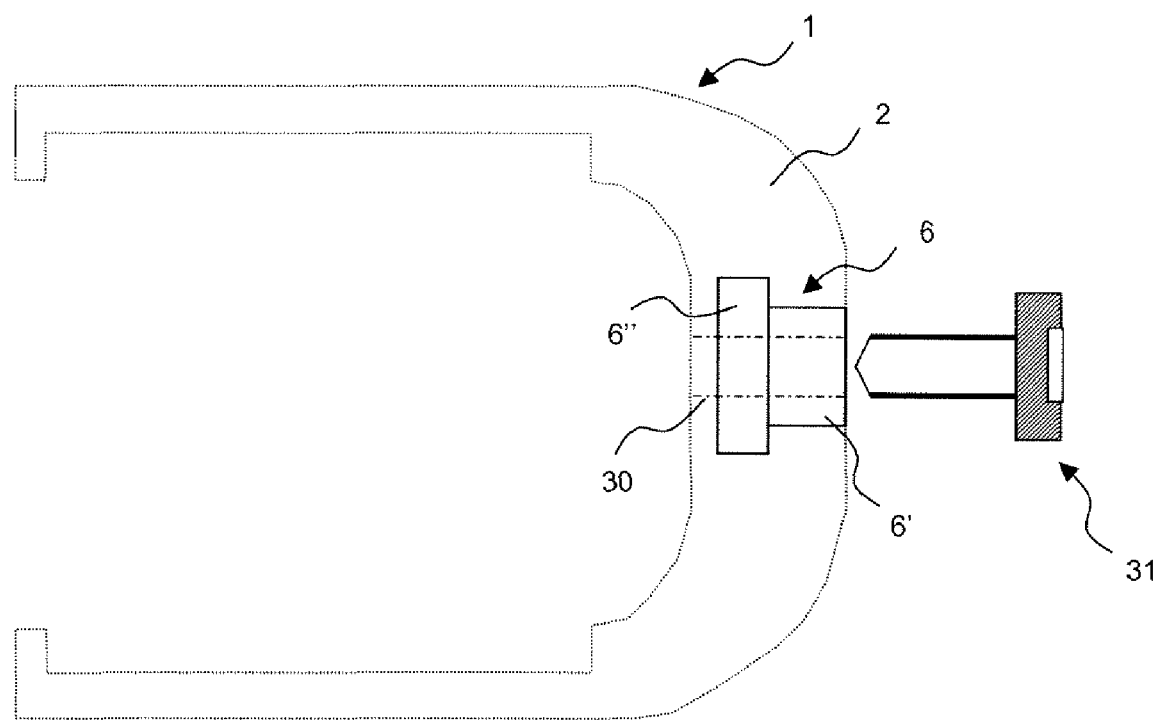
FIG. 3 represents the attachment part and an insert adapted to cooperate with a screw.

FIG. 3 represents the attachment part 1 and the insert 6 in the bar 2. The insert 6 as finally machined is threaded and includes a thread 30 adapted to receive a screw 31.

The main advantage of this kind of device is the reduction of the forces on the glued joint given the similar coefficients of expansion of the carbon skins of the panels and the attachment parts consisting of bundles of carbon fibres impregnated with a heat-set resin.

An advantage of this kind of solution is that it simplifies the gluing process thanks to the geometry of the attachment part. Also, the surfaces of the attachment part intended to be glued necessitate no specific treatment before gluing. Furthermore, production costs are low compared to producing attachment parts in titanium.

Another advantage is the high strength of the axial screwed connection supported by the insert, which is positioned and retained in the attachment part at the moulding stage.

Figure 4:
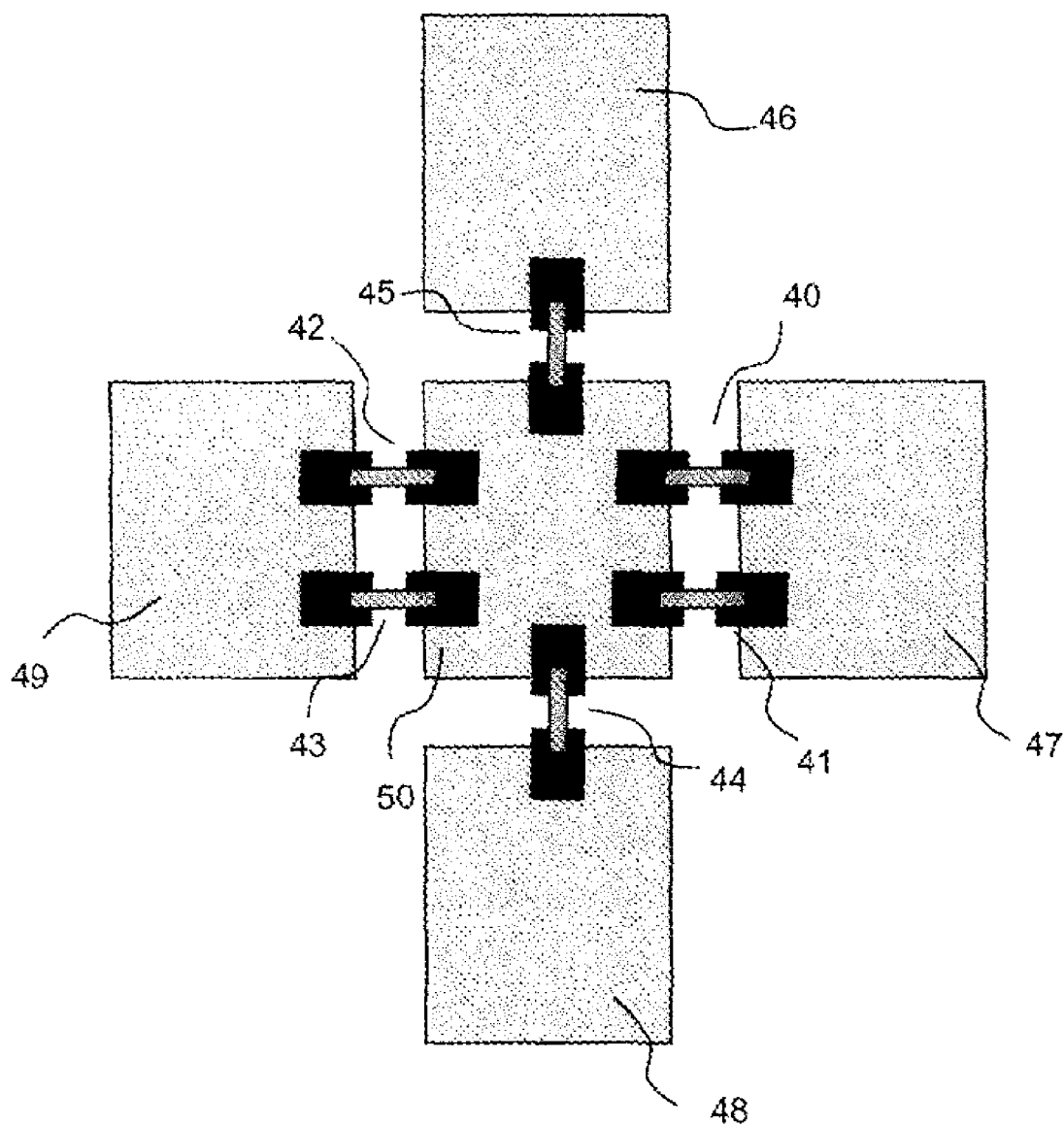
FIG. 4 represents diagrammatically an example of five assembled panels and the attachment parts fixing them together.

FIG. 4 represents an example of assembling five structural panels 46, 47, 48, 49, 50 held together by attachment parts as described above, fixed together and forming double axial attachments 40, 41, 42, 43, 44, 45.

This example illustrates one instance of assembling a number of structural panels.

Another way to produce the structural device of the invention is to produce a moulded part having only one face, i.e. having only one blade. The principle of gluing together the blade of the attachment part and the skin of the panel remains as described above.

Another embodiment provides blades of the attachment part 1 including a number of holes or orifices. For example, moulding the attachment part 1 enables the mould to form three holes in each of the blades.

In this embodiment, one hole in each of the blades of the attachment part 1 is for inserting the glue into the recess and the other two holes are for positioning the blades on the panel by means of markings applied to the panel beforehand.

The markings can advantageously be holes so that the position of the blades on the skins of the panel can be checked by inserting a pin into the two holes in each of the blades.

The respective holes in the blades and the skins can then be superposed and held by a cylindrical axial insert during gluing of the attachment part and the panel and removed afterwards, for example.

The structure of the invention is not limited to the [−50° C., +80° C.] range of this application and can advantageously withstand temperatures outside these limits, in particular in a wider range of temperature from −180° to +200°.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A structural panel assembly structure comprising:
a rigid, substantially planar panel;
at least one one-piece attachment part, produced by moulding, glued to the panel, the attachment part comprising:
at least one first planar face comprising:
a recess that can receive glue; and
at least one rim intended to retain the glue around the recess and at least one opening;
a bar fastened to the first planar face, wherein
the materials of the attachment part and the panel are composite materials; and
the bar comprises a metal insert the coefficient of expansion whereof is greater than that of the material of the attachment part, the metal insert being positioned in the mould when moulding the attachment part.

2. The structure according to claim 1, wherein the attachment part is made up of bundles of carbon fibres pre-impregnated with a heat-set resin.

3. The structure according to claim 1, wherein the metal insert comprises a flange inside the bar preventing extraction of the insert.

4. The structure according to claim 3, wherein the metal insert comprises two substantially cylindrical parts, the part of greater diameter being the flange.

5. The structure according to claim 1, wherein the metal insert is constructed of aluminum.

6. The structure according to claim 1, wherein the axis of the metal insert is in the plane of the planar face of the attachment part.

7. The structure according to claim 1 further comprising a second planar face parallel to the first planar face and having the same characteristics, both planar faces being fastened to the bar, the distance between the two planar faces substantially corresponding to the thickness of the panel, the attachment part forming a saddle.

8. The structure according to claim 7, wherein the saddles each comprise at least three openings, one of which can be used to insert glue into the recess of the blades and the other two being locating holes.

* * * * *